(12) United States Patent
Hikita et al.

(10) Patent No.: US 8,979,378 B2
(45) Date of Patent: Mar. 17, 2015

(54) SLIDING BEARING

(71) Applicants: Yasuhiro Hikita, Toyota (JP); Shinichi Kato, Toyota (JP); Yuichiro Kimura, Toyota (JP); Motoichi Murakami, Toyota (JP)

(72) Inventors: Yasuhiro Hikita, Toyota (JP); Shinichi Kato, Toyota (JP); Yuichiro Kimura, Toyota (JP); Motoichi Murakami, Toyota (JP)

(73) Assignees: Taiho Kogyo Co., Ltd., Toyota-shi, Aichi (JP); Toyota Jidosha Kabushiki Kaisha, Toyota-shi, Aichi (JP)

( * ) Notice: Subject to any disclaimer, the term of this patent is extended or adjusted under 35 U.S.C. 154(b) by 0 days.

(21) Appl. No.: 14/349,174

(22) PCT Filed: Feb. 28, 2013

(86) PCT No.: PCT/JP2013/055350
§ 371 (c)(1),
(2) Date: Apr. 2, 2014

(87) PCT Pub. No.: WO2013/140977
PCT Pub. Date: Sep. 26, 2013

(65) Prior Publication Data
US 2014/0248012 A1    Sep. 4, 2014

(30) Foreign Application Priority Data
Mar. 21, 2012   (JP) .................. 2012-063037

(51) Int. Cl.
*F16C 33/10* (2006.01)
*F16C 17/02* (2006.01)
*F16C 9/02* (2006.01)
*F16C 33/12* (2006.01)

(52) U.S. Cl.
CPC ........... *F16C 33/1065* (2013.01); *F16C 17/022* (2013.01); *F16C 33/103* (2013.01); *F16C 9/02* (2013.01); *F16C 33/121* (2013.01)
USPC ........................................ 384/288; 384/291

(58) Field of Classification Search
CPC ......... F16C 17/00; F16C 17/02; F16C 17/022
USPC .................. 384/283, 287, 288, 289, 291, 294
See application file for complete search history.

(56) References Cited

U.S. PATENT DOCUMENTS

| 4,274,684 | A  |   | 6/1981 | Richfield |
|-----------|----|---|--------|-----------|
| 6,872,004 | B2 | * | 3/2005 | Mian et al. ..................... 384/288 |
| 2003/0161560 | A1 | * | 8/2003 | Whitney ....................... 384/294 |

FOREIGN PATENT DOCUMENTS

| JP | 54151749 A | * 11/1979 | .............. F16C 33/10 |
| JP | 10-259827 A | 9/1998 | |
| JP | 2003-532036 A | 10/2003 | |
| WO | WO 2011/098290 A1 | 8/2011 | |

OTHER PUBLICATIONS

International Search Report for PCT/JP2013/055350 (1 page).

* cited by examiner

*Primary Examiner* — Phillip A Johnson
(74) *Attorney, Agent, or Firm* — Flynn, Thiel, Boutell & Tanis, P.C.

(57) ABSTRACT

A sliding bearing 2 has a sliding surface 2a in sliding contact with an outer peripheral surface of a crankshaft 1 (rotating shaft) and a relief portion 4 formed along a circumferential direction on both axial end portions of the sliding surface 2a and retreated outward in a radial direction from the sliding surface 2a.

6 Claims, 2 Drawing Sheets

SLIDING BEARING

TECHNICAL FIELD

The present invention relates to a sliding bearing and more particularly to a sliding bearing having a relief portion formed along a circumferential direction on at least one axial end portion of a sliding surface and retreated outward in a radial direction from the sliding surface.

BACKGROUND ART

As a sliding bearing for pivotally supporting a rotating shaft such as a crankshaft of an engine, a sliding bearing having a sliding surface in sliding contact with an outer peripheral surface of the rotating shaft and a relief portion formed along a circumferential direction on at least one axial end portion of the sliding surface and retreated outward in a radial direction from the sliding surface has been known (Patent Literature 1).

According to the sliding bearing having such a configuration, a lubricant flowing between the rotating shaft and the sliding bearing causes a disturbance or a swirl inside the relief portion, whereby heat is transferred from the sliding bearing to the lubricant, and the sliding bearing is cooled (25th column, FIGS. 3 and 5 to 8).

PRIOR ART DOCUMENT

Patent Literature

Patent Literature 1: National Publication of International Patent Application No. 2003-532036

SUMMARY OF INVENTION

Problems to be Solved by the Invention

However, if the sliding bearing of the above described Patent Literature 1 is used, since a cooling effect by the heat transfer is excessively obtained, when an oil temperature is low such as immediately after start-up of the engine or the like, the lubricant cannot be rapidly warmed, but a rotation torque of the crankshaft is increased due to the viscosity of the lubricant, and a problem occurs that the fuel efficiency deteriorates.

Moreover, as a recent engine for an automobile, in an engine such as a hybrid engine or an engine performing an idling stop in which a crankshaft frequently stops, a temperature of the lubricant can easily lower, and when the crankshaft is to be rotated again, the above described problem occurs.

In view of such problems, a sliding bearing capable of rapidly raising a temperature of the lubricant while the cooling effect using the relief portion is obtained is provided.

Means for Solving the Problems

That is, the present invention is, in a sliding bearing having a sliding surface in sliding contact with an outer peripheral surface of a rotating shaft and a relief portion formed along a circumferential direction on at least one axial end portion of the sliding surface and retreated outward in a radial direction from the sliding surface, characterized in that the relief portion is provided with a flat portion formed on the axial end portion and a tapered portion formed so as to become gradually deeper from the flat portion towards a boundary portion between the relief portion and the sliding surface.

Advantageous Effect of Invention

According to the above described invention, the lubricant having flowed between the sliding bearing and the rotating shaft flows into the tapered portion formed in the relief portion and forms a disturbance or a swirl and cools the sliding bearing by heat transfer.

However, this lubricant moves to a space formed above the flat portion along the inclination of the tapered portion and between the flat portion and the rotating shaft and forms a high-pressure region by a flow of the lubricant above the flat portion and thus, it becomes difficult for the lubricant between the sliding bearing and the rotating shaft to be discharged.

As a result, the lubricant having cooled the sliding bearing can be made to stay in the space formed between the tapered portion and the rotating shaft, and a temperature of the lubricant can be rapidly raised.

MODE FOR CARRYING OUT THE INVENTION

Figure 1:
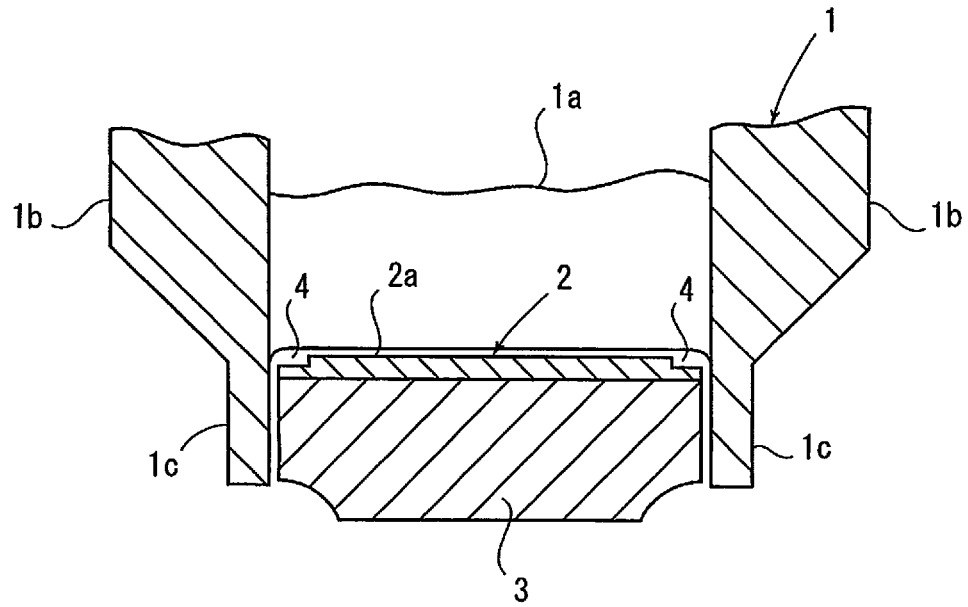
FIG. 1 is a sectional view of an essential part illustrating an example of the present invention.

Illustrated embodiments will be described below, and FIG. 1 illustrates a part of an internal structure of an engine and illustrates a crankshaft 1 pivotally supported by a cylinder block, not shown, and a sliding bearing 2 pivotally supporting this crankshaft 1.

The crankshaft 1 is provided with a crank journal 1a as a rotating shaft in sliding contact with the sliding bearing 2 and a crank arm 1b provided on both ends of the crank journal 1a, and at a mounting position of the crank journal 1a in the crank arm 1b, a flange 1c formed having a diameter larger than the crank journal 1a is provided.

The sliding bearing 2 is formed as a so-called split bearing and pivotally supports the crank journal 1a by bringing the two semispherical sliding bearings 2 into contact with each other and is fixed to a cylinder block by a cap 3 illustrated below in the figure.

Moreover, the sliding bearing 2 has a constitution in which a copper or aluminum bearing alloy is formed on a back metal made of a metal or steel sheet, and a plating or resin coating can be formed on the surface of the bearing alloy as necessary. The surface of this sliding bearing 2 constitutes a sliding surface 2a in sliding contact with the crank journal 1a.

Figure 2:
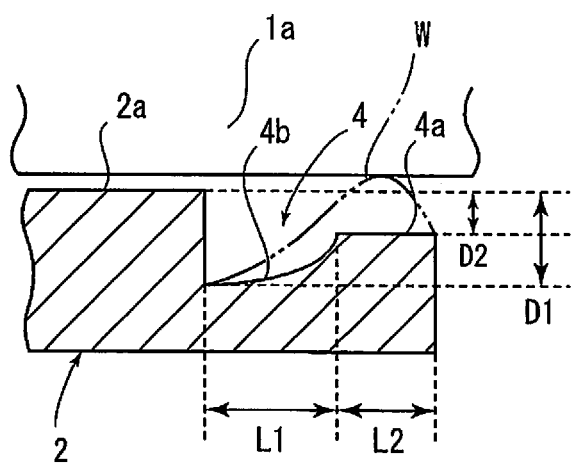
FIG. 2 is an enlarged sectional view illustrating the essential part in FIG. 1.

In FIG. 2, a sectional view in which an end portion on the right side in the figure of the sliding bearing 2 is enlarged is illustrated, in which the sliding surface 2a is located on an upper part in the figure, and an end portion on the left side, not shown, is formed symmetrically to this FIG. 2.

As illustrated in FIG. 2, on both end portions in an axial direction of the sliding surface 2a in the sliding bearing 2, a relief portion 4 formed along a circumferential direction and retreated outward in a radial direction from the sliding surface 2a is formed.

The relief portion 4 is composed of a flat portion 4a formed on the axial end portion and a tapered portion 4b formed so as to become gradually deeper from the flat portion 4a towards a boundary portion between the relief portion 4 and the sliding surface 2a, and the tapered portion 4b is formed having a substantially arc-shaped section in a direction in parallel with the axial direction.

Moreover, a depth D1 at the deepest position with respect to the sliding surface 2a in the tapered portion 4b and a depth D2 to the sliding surface 2a in the flat portion 4a are preferably set with the following relationship:

$$1.5 \leq D1/D2 \leq 5 \quad \text{(Expression 1)}$$

Moreover, a width L1 of the tapered portion 4b and a width L2 of the flat portion 4a are preferably set with the following relationship:

$$0.5 \leq L1/L2 \leq 3 \quad \text{(Expression 2)}$$

According to the sliding bearing 2 having the above described configuration, the following effects can be obtained.

If the crankshaft 1 is rotated by start of the engine, from a lubricant supply hole, not shown, formed in the crank journal 1a, a lubricant is supplied to a space between the crank journal 1a and the sliding bearing 2, and the lubricant flows in the axial direction of the sliding bearing 2.

Subsequently, the lubricant flows into the relief portions 4 formed on both end portions of the sliding surface 2a and forms a disturbance or a swirl inside a space formed by the tapered portion 4b and the crank journal 1a in the relief portion 4.

If the lubricant forms a disturbance or a swirl, heat generated by the rotation of the sliding bearing 2 and the crankshaft 1 is transferred from the sliding bearing 2 to the lubricant, whereby the sliding bearing 2 is cooled.

Subsequently, the lubricant in the tapered portion 4b is to further move to the axial end portion of the sliding bearing 2, but since the tapered portion 4b is formed so as to become gradually deeper from the flat portion 4a to the boundary portion between the relief portion 4 and the sliding surface 2a, the lubricant flows along this tapered portion 4b.

Thus, the lubricant flows from the boundary between the tapered portion 4b and the flat portion 4a to a tangential direction of the tapered portion 4b, that is, to diagonally upper right illustrated in FIG. 2 and flows into a space formed between the flat portion 4a and the crank journal 1a.

Then, since the flat portion 4a is formed having a required width in the axial direction, a flow of the lubricant collides against the crank journal 1a located above the flat portion 4a, whereby a high-pressure region W by the flow of the lubricant as illustrated by an imaginary line in the figure is formed.

As described above, by forming the high-pressure region W at a position of the flat portion 4a by the flow of the lubricant, the disturbance or the swirl of the lubricant formed at the position of the tapered portion 4b is made difficult, by this high-pressure region W, to be discharged to the outside of the sliding bearing 2.

That is, the lubricant whose temperature has been raised by heat transfer can be held in the space formed between the tapered portion 4b and the crank journal 1a, and particularly if an oil temperature of the lubricant is low at the start-up of the engine, by rapidly raising the temperature of the lubricant, the viscosity of the lubricant can be lowered.

Moreover, since the disturbance or the swirl of the lubricant is made difficult, by the high-pressure region W, to be discharged to the outside of the sliding bearing 2, a leakage amount of the lubricant from the crank journal 1a and the sliding bearing 2 can be suppressed.

Particularly, in an engine in which the rotation and stopping of the crankshaft 1 is frequently performed, like a hybrid engine or an engine performing idling stop, the temperature of the lubricant is lowered when the crankshaft 1 is stopped and the viscosity is increased and thus, by using the sliding bearing 2 having the above described configuration, the temperature rise of the lubricant can be realized rapidly and the rotation resistance of the crankshaft 1 is reduced so that the fuel efficiency can be improved.

Moreover, by setting the dimensions of the flat portion 4a and the tapered portion 4b on the basis of the expression 1 and the expression 2, it was found that the above described effect can be effectively obtained.

On the other hand, in the sliding bearing described in FIGS. 3 and 5 to 8 in Patent Literature 1, the flat portion is not formed in the relief portion, and it is configured such that the disturbance or the swirl of the lubricant formed inside the relief portion is rapidly discharged from a space between the sliding bearing and the crank journal.

As a result, the leakage amount of the lubricant from the space between the sliding bearing and the crank journal is large, and since the lubricant whose temperature has been raised by heat transfer from the sliding bearing is rapidly discharged from the relief portion, the temperature rise of the lubricant at the start-up of the engine cannot be realized rapidly.

Figure 3:
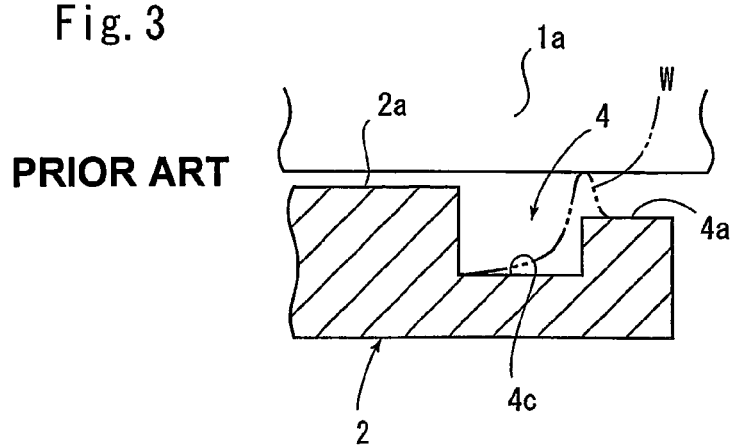
FIG. 3 is an enlarged sectional view illustrating a prior art technology.
Figure 4:
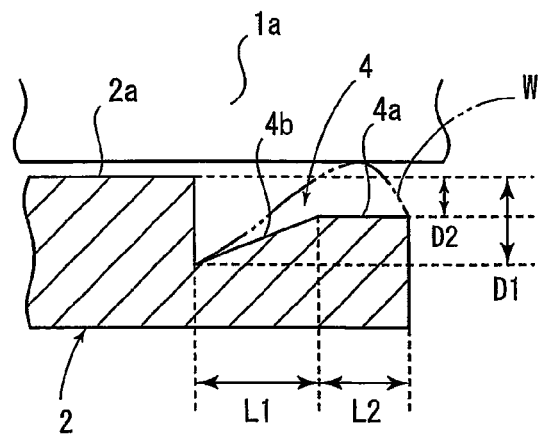
FIG. 4 is an enlarged sectional view illustrating a second embodiment of the invention.

On the other hand, in the sliding bearing described in FIG. 4 of Patent Literature 1 illustrated in FIG. 3, though the flat portion 4a constituting the relief portion 4 is formed on the end portion of the sliding surface 2a, a space between the sliding surface 2a and the flat portion 4a is not tapered, and between the sliding surface 2a and the flat portion 4a, a groove 4c having both side surfaces formed vertically is formed.

With such a configuration, the lubricant having flowed between the sliding surface 2a and the crank journal 1a as illustrated in FIG. 3 generates a disturbance or a swirl inside the groove 4c, but since this lubricant flows in a vertical direction along a side surface of the groove 4c after that, the high-pressure region W formed by the flow of the lubricant is formed on the boundary portion between the flat portion 4a and the groove 4c as illustrated by an imaginary line, but a width of the high-pressure region W is small, and the efficiency for holding the temperature of the lubricant is poor as compared with the sliding bearing 2 of the first embodiment, and the temperature of the lubricant cannot be rapidly raised.

FIG. 4 illustrates the sliding bearing 2 of a second embodiment according to the present invention.

In the sliding bearing 2 according to this embodiment, though a shape of the tapered portion 4b in the relief portion 4 is formed so as to become gradually deeper from the flat portion 4a toward the boundary portion between the relief portion 4 and the sliding surface 2a, it is formed having a linear section in a direction in parallel with the axial direction.

Moreover, in this embodiment, too, the dimensions of the flat portion 4a and the tapered portion 4b are preferably set on the basis of the expression 1 and the expression 2.

Even in such a configuration, since the high-pressure region W formed of the flow of the lubricant can be formed by the tapered portion 4b between the flat portion 4a and the crank journal 1a, the temperature of the lubricant can be rapidly raised, and also, the lubricant can be held.

Figure 5:
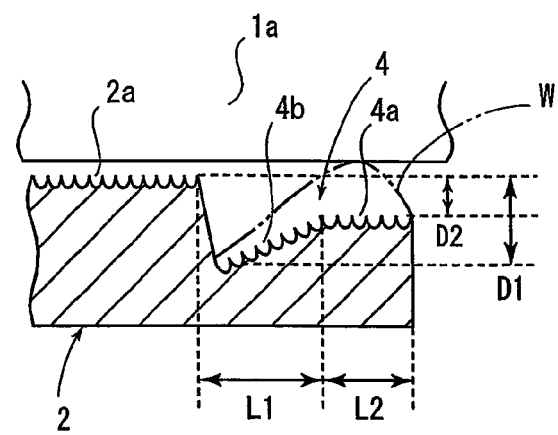
FIG. 5 is an enlarged sectional view illustrating a third embodiment of the invention.

FIG. 5 illustrates the sliding bearing 2 of a third embodiment according to the present invention.

In the sliding bearing 2 according to this embodiment, as compared with the sliding bearing 2 of the second embodiment, that is, the sliding bearing 2 in which the tapered portion 4b is formed having a linear section, a plurality of micro grooves each having a depth of several μm and continuously extending in the circumferential direction on the surfaces of the sliding surface 2a and the relief portion 4 are formed.

In order, to form the micro grooves, the boundary between the sliding surface 2a and the tapered portion 4b of the relief portion 4 is an inclined surface, and the inclined surface may be formed on the sliding bearing 2 of the first and second embodiments.

Moreover, in this embodiment, too, dimensions of the flat portion 4a and the tapered portion 4b are preferably set on the basis of the expression 1 and the expression 2.

Even in such a configuration, since the high-pressure region W formed of the flow of the lubricant can be formed by the tapered portion 4b between the flat portion 4a and the crank journal 1a, the temperature of the lubricant can be rapidly raised, and also, the lubricant can be held.

Moreover, by forming the micro grooves, a sliding performance between the sliding surface 2a and the crank journal 1a can be improved, and the sliding bearing 2 with an excellent anti-seizure property or the like can be obtained.

The micro grooves may be formed in the sliding bearing 2 having the tapered portion 4b having a substantially arc-shaped section in the first embodiment.

REFERENCE SIGNS LIST 1 crankshaft
1a crank journal (rotating shaft)
2 sliding bearing
2a sliding surface
4 relief portion
4a flat portion
4b tapered portion
W high-pressure region

The invention claimed is:

1. A sliding bearing having a sliding surface in sliding contact with an outer peripheral surface of a rotating shaft and a relief portion formed along a circumferential direction on at least one axial end portion of the sliding surface and retreated outward in a radial direction from the sliding surface, characterized in that the relief portion is provided with a flat portion which is formed on the at least one axial end portion and continuously extending in an axial direction and a tapered portion formed so as to become gradually deeper from the flat portion toward a boundary portion between the relief portion and the sliding surface.

2. The sliding bearing according to claim 1, wherein a depth D1 at the deepest position with respect to the sliding surface in the tapered portion and a depth D2 to the sliding surface in the flat portion are set with a relationship of:

$$1.5 \leq D1/D2 \leq 5.$$

3. The sliding bearing according to claim 1, wherein a width L1 of the tapered portion and a width L2 of the flat portion are set with a relationship of:

$$0.5 \leq L1/L2 \leq 3.$$

4. The sliding bearing according to claim 1, wherein the tapered portion has a substantially arc-shaped section in a direction in parallel with an axial direction.

5. The sliding bearing according to claim 1, wherein the tapered portion has a linear section in a direction in parallel with an axial direction.

6. The sliding bearing according to claim 1, wherein on surfaces of the flat portion and the tapered portion, a plurality of micro grooves continuously extending in a circumferential direction are formed.

* * * * *